United States Patent [19]

Scott et al.

[11] Patent Number: 4,959,602

[45] Date of Patent: Sep. 25, 1990

[54] AC MOTOR DRIVE WITH IMPROVED VOLTAGE-SOURCE INVERTER

[75] Inventors: Kenneth C. Scott, San Diego, Calif.; Colin D. Schauder, Murrysville Boro, Pa.

[73] Assignee: Westinghouse Electric Corp., Pittsburgh, Pa.

[21] Appl. No.: 360,633

[22] Filed: Jun. 2, 1989

[51] Int. Cl.[5] .............................................. H02D 3/18
[52] U.S. Cl. ..................................... 318/803; 318/762
[58] Field of Search ............... 318/762, 800, 801, 803, 318/807, 808, 811, 82, 376; 363/34, 35, 37, 126

[56] References Cited

U.S. PATENT DOCUMENTS

| | | | |
|---|---|---|---|
| 4,353,023 | 10/1982 | Kawada et al. | 318/762 |
| 4,395,612 | 3/1983 | Wirth | 318/803 |
| 4,434,393 | 2/1984 | Kobari et al. | 318/757 |
| 4,670,827 | 6/1987 | Schneider | 318/803 |
| 4,697,131 | 9/1987 | Schauder et al. | 318/762 |
| 4,788,635 | 11/1988 | Heinrich | 363/35 |

Primary Examiner—William M. Shoop, Jr.
Assistant Examiner—John W. Cabela
Attorney, Agent, or Firm—C. N. Lorin

[57] ABSTRACT

A bridge between the inductor and the capacitor of the DC-Link of a voltage-source inverter AC motor drive includes a GTO (or transistor) device used for forced-commutation in the regenerating mode, while the current is controlled ON and OFF according to a duty-cycle defined by an hysteresis circuit to hold the current flowing into the inductor to a magnitude which establishes a boost on the capacitor voltage, so that in the motoring, as well as the regenerating mode of operation, the voltage of the capacitor is kept constant and higher than upon the converter output.

3 Claims, 8 Drawing Sheets

MOTORING FIG.12A

REGENERATING FIG.12B

DEAD-TIME

FIG.13

AC MOTOR DRIVE WITH IMPROVED VOLTAGE-SOURCE INVERTER

FIELD OF THE TECHNIQUE

The invention relates to voltage-source inverters in general, and more particularly to a voltagesource inverter motor drive.

BACKGROUND OF THE INVENTION

It has been shown in U.S. Pat. No. 4,697,131 how to improve the operation of a voltage-source inverter and of a variable-frequency constant-voltage AC motor drive, by providing in the regenerating mode a current path for the negative DC-link current so as to crisscross, or invert, current flow from the inverter side into the AC-to-DC converter terminals, and to sequentially interrupt such current path, concurrently with the triggering of a power switch in the converter firing sequence, thereby to create a dead-time in the commutation sequence. This is effected with the help of diodes, used in the forward mode to pass current directly from converter to inverter, and with the help of diagonally connected network including a GTO and an auxiliary thyristor, turned ON concurrently with the pair of thyristors next in the converter firing sequence, so as to cause reverse polarity in the DC-link, such GTO triggering being followed by current bypassing, with the assist of the diodes, when turning the GTO OFF, so as to create a dead-time before the subsequent thyristor firing in the converter sequence. For the purpose of this description, U.S. Pat. No. 4,697,131 is hereby incorporated by reference.

The operation of such a motor drive can still be improved. One object is to provide protection against current surges which might cause fuse blowing. Another object is to increase the capability of the circuit by boosting the DC-link voltage so as to maximize inverter and motor usage under a given AC power supply voltage.

It has also been shown in U.S. Pat. No. 4,788,635 that a GTO device has been added to a voltagesource inverter and controlled with a duty cycle in the regenerating mode, in order to match the voltage on the inverter side of the DC-link with the voltage on the mains converter side, thereby solving the disparity between the voltage available from the AC-to-DC converter in the motoring mode and the voltage from the converter under natural commutation in the regenerating mode.

SUMMARY OF THE INVENTION

The invention resides in a voltage-source inverter for a motor drive wherein, between inductor and capacitor of the DC-link, unidirectional switches are interposed and a diagonally connected series-network is provided comprising a GTO device (or transistor) and an auxiliary thyristor, the GTO (or transistor) being cyclically controlled by switching ON and OFF at a high frequency during the operation, in the regenerating as well as in the motoring mode, so as to maintain current flow through the inductor in the same direction at a level assigned by closed-loop control, so as establish between converter and inverter a differential voltage compensating for any voltage fluctuation in the mains voltage and sufficient to keep the inverter voltage constant under all conditions.

According to another aspect of the invention, such GTO (or transistor) control action is effected for protection against excessive current drawn through the AC to DC converter, and such protection action may be used in conjunction with the boost voltage control operation.

DESCRIPTION OF THE INVENTION

Figure 1:
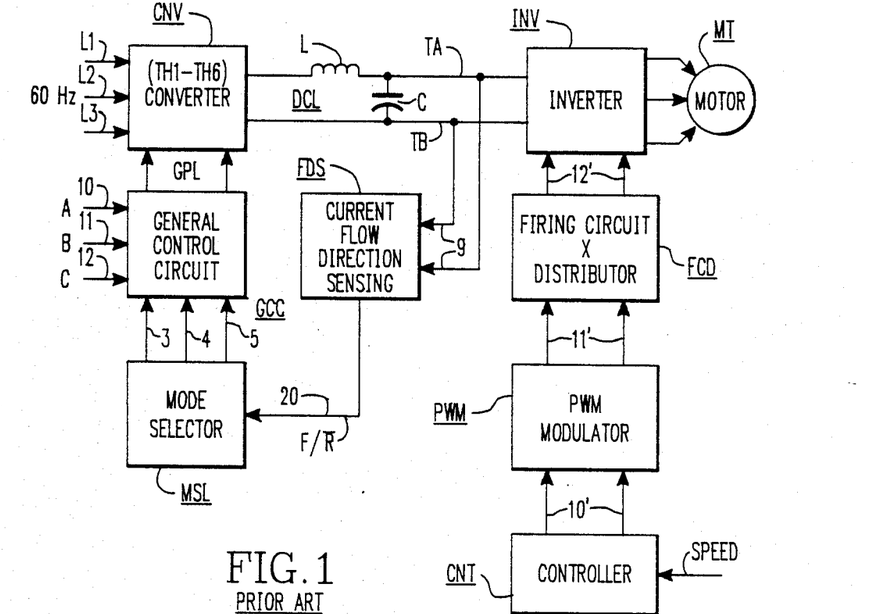
FIG. 1 shows a conventional AC motor drive controlled for operation in the motoring and in the regenerating modes.

Referring to FIG. 1, an AC motor drive of the prior art is shown including a converter CNV supplied with AC power from mains lines L1, L2, L3. The converter is a six-pulse bridge having six thyristors TH1–TH6. The converter is controlled by a general control circuit GCC as generally known. Lines 10, 11, 12 are the phases representative signals for circuit GCC used to generate the gating pulses (GPL) for the thyristors. Converter CNV is connected through a DC-link DCL extending to the input of an inverter INV which outputs into an AC motor MT. The DC-link includes an inductor L in series between output and input and a capacitor C across the input of the inverter. As illustrated in FIG. 1, current flow direction sensing circuit FDS, responsive by lines 9 to the DC-link flowing current direction, generates a signal (F/R) characterizing the operative mode, forward (motoring) (F) or regenerating (R), and outputted on line 20, applied to a mode selector circuit MSL which by lines 3, 4, 5 chooses the proper operative mode for circuit GCC. Another way of detecting the reversal of energy being returned to the DC-link when the motor is braking is to detect a sudden increase of the DC-link voltage when this happens, and conversely a sudden collapse of DC-link voltage when the motor returns to motoring This is generally known.

The inverter is controlled according to speed by a controller CNT which by lines 10' establishes the duty cycle of a pulse-width modulator PWM which, in turn by lines 11', determines the operation of the firing circuit and distributor FCD for the thyristors of the inverter.

The invention pertains to an assisted commutation converter (ACC) used for circuit CNV which is illustrated in U.S. Pat. No. 4,697,131. The invention also pertains to control of such ACC circuit in two situations: when the motor is driving forward (motoring in either direction) and when, during braking, motor MT under load is regenerating through the inverter and the DC-link into the converter.

Figure 2:
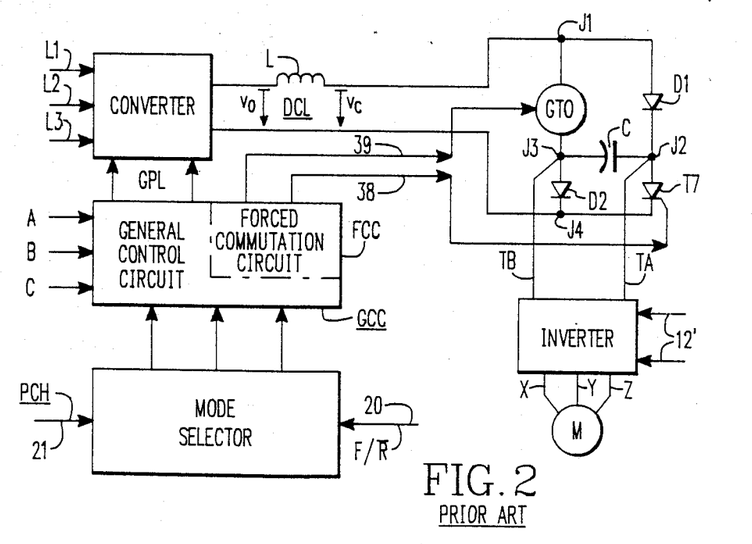
FIG. 2 shows an AC motor drive having a forced-commutation feature added to the converter of FIG. 1, called an assisted commutation converter (ACC), such as described in U.S. Pat. No 4,697,131.

FIG. 2 shows the assisted commutation converter circuit (ACC) of the prior art, as it is used according to U.S. Pat. No. 4,697,131 to generate from an AC power supply a DC voltage $V_o$ with a converter (six-thyristor bridge TH1-TH6), via a DC-link DCL including a reactor (inductance L) in series and a capacitor C in parallel (across DC terminals TA, TB) from which an inverter INV derives three AC phases X,Y,Z applied to an AC load (motor MT). The voltage across the output of the converter (thus, before the inductor L) is $V_o$, whereas the voltage developed across the capacitor (thus after the inductor) is $V_c$. As explained in the incorporated-by-reference patent, while the DC terminals (TA,TB) are connected to the ends of capacitor C, the positive output from the converter (at J1 after the reactor) and the negative output from the converter (at J4) are connected to the capacitor ends via respective diodes D1 (positive side) and D2 (negative side). A switch SW1 (shown as a GTO device, but which could be a transistor) is also connected between J1 and the nodal point J3 which is between D2 and TB. An auxiliary thyristor TH7 is connected between J4 and the nodal point J2 which is between D1 and TA. The GTO (SW1) and the auxiliary thyristor (TH7) are controlled by lines 39 and 38, respectively, from a forced-commutation circuit FCC added to the general control circuit GCC. The purpose is, in the firing sequence of the converter, to force the commutation, when in the regenerating mode, of thyristors TH1-TH6 of the converter which otherwise commutate naturally. The mode selector also includes control by line 21 during precharging (PCH), as explained in the patent.

Figure 3:
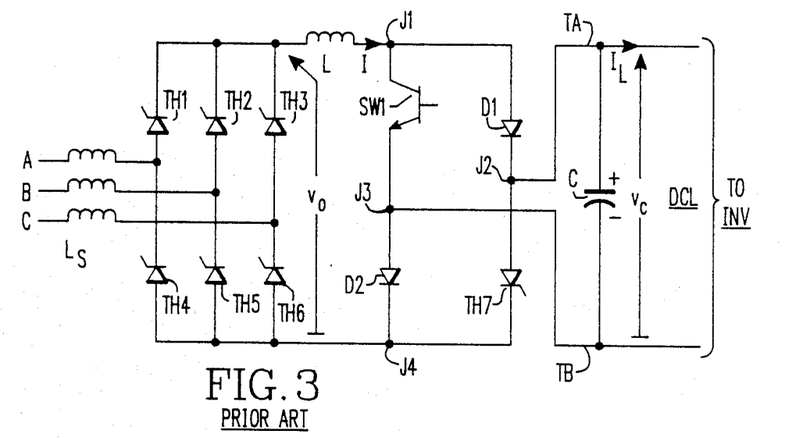
FIG. 3 shows specifically the converter circuit (ACC) of FIG. 2, including an added GTO and an auxiliary thyristor as combined according to U.S. Pat. No. 4,697,131 for generating from an AC power supply a DC voltage for an inverter.
Figure 4:
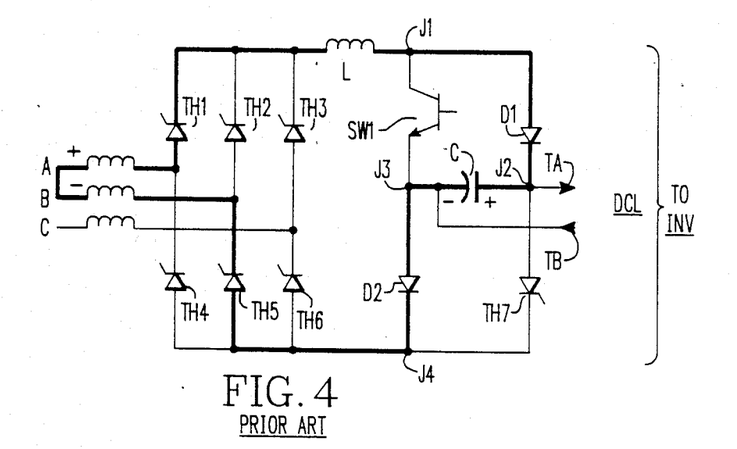
FIG. 4 shows the forward (motoring) power flow conduction path in the ACC circuit of FIG. 3.

FIG. 3 shows the prior art ACC circuit. It includes a switch SW1 (illustrated as a transistor), an auxiliary thyristor (TH7), diodes D1 and D2, and the six thyristors TH1-TH6 of the converter bridge of FIG. 1. FIG. 4 shows the same circuit in the motoring mode. In this mode, switch SW1 and thyristor TH7 are not used. The current flow path is illustrated when thyristors TH1 and TH5 are conducting. Thus, energy flows directly from the AC to DC converter toward the inverter. Diodes D1 and D2 help charge the capacitor C in the process.

Figure 5A:
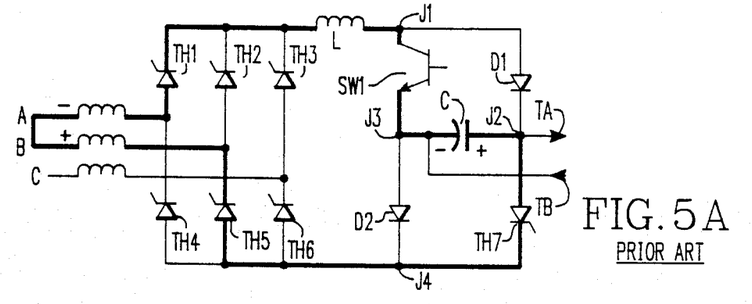
FIGS. 5A, 5B, 5C and 5D show the commutation steps in the regeneration mode for the circuit of FIG. 3.
Figure 5B:
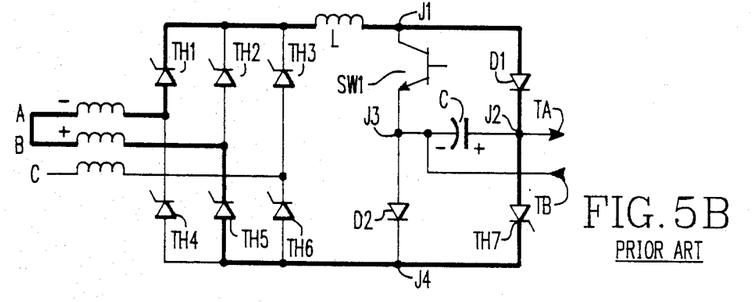
Figure 5C:
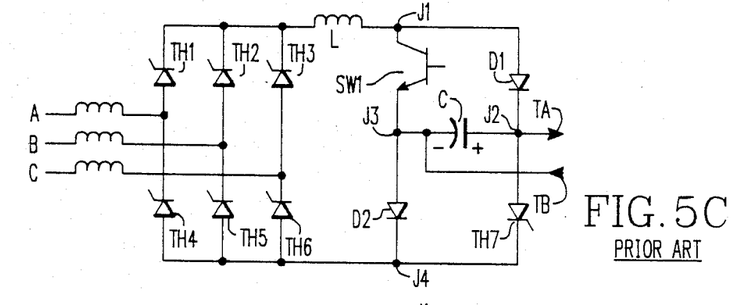
Figure 5D:
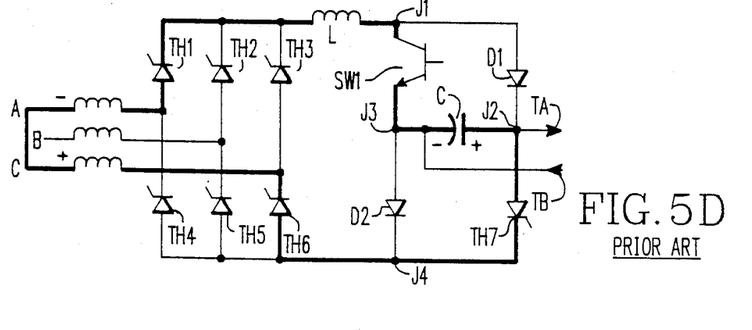

FIGS. 5A to 5D show the ACC circuit of the prior art in the regenerating mode. Now, energy passes from the inverter to the AC to DC converter. Since this should be effected from the same polarity terminals on the inverter side (TA, TB), whereas on the converter side polarities have been reversed, switch SW1 and thyristor TH7 provide such criss-crossing of the terminals in the DC-link. Switch SW1 when conducting will (over nodal points J1, J3) divert the current which otherwise would flow through diode D1 onto capacitor C, whereas TH7 when conducting will (over J2, J4) divert the current which otherwise would flow through D2 from capacitor C. Such diverting actions of SW1 and TH7 appear in FIGS. 5A and 5D. According to FIG. 5B, diode D1 comes into play when device SW1 is turned OFF. The current loop via TH7 and diode D2 will be extinguished once thyristor TH7 recovers. This leads to the non-conduction state of FIG. 5C. A dead-time is created in the commutation process. No current is flowing, to or from capacitor C. FIG. 5D shows the next step in the sequence of firing the thyristors of the converter. Thyristors TH1 and TH3 were fired when in FIG. 5A. Thyristors TH1 and TH6 are the new pair of thyristors involved in FIG. 5D. All this has been explained in the incorporated by reference patent.

Figure 6:
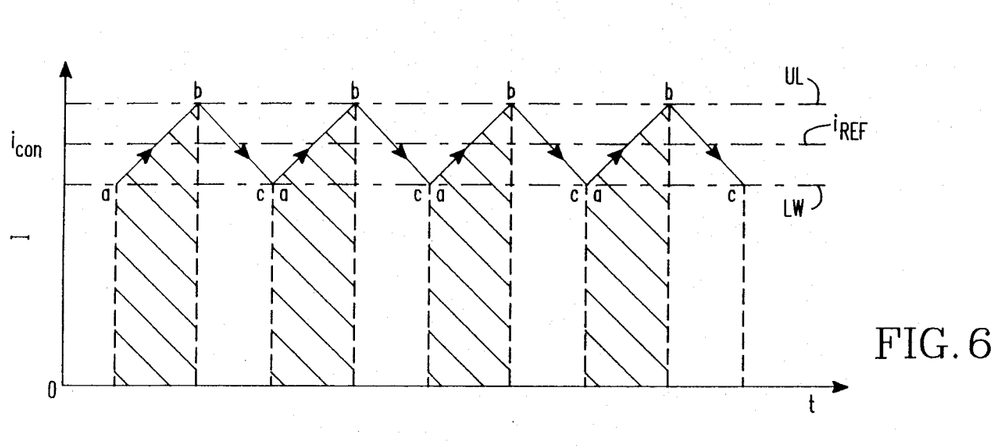
FIG. 6 is a curve showing inductor current increases and decreases concomitant with successive and alternate periods of conduction and non-conduction effected upon the SW1 switch of FIG. 3.
Figure 7A:
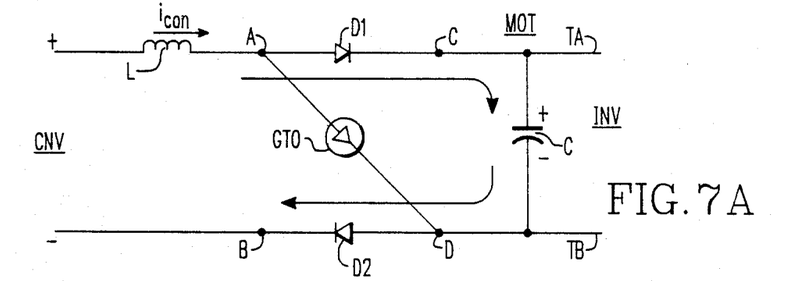
FIGS. 7A and 7B show, respectively, the normal and the bypassing alternating phases during a duty-cycle of switch SW1 of FIG. 3 in the motoring mode.
Figure 7B:
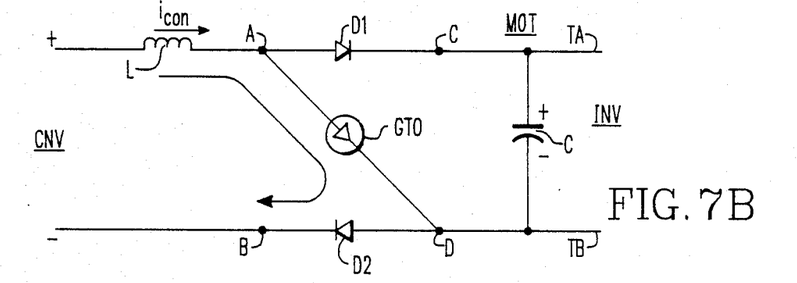
Figure 8A:
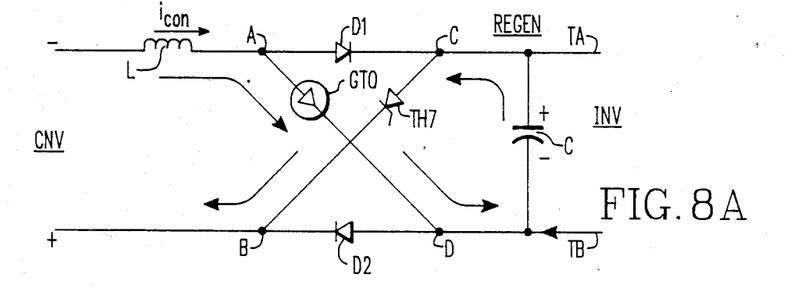
FIGS. 8A and 8B are like FIGS. 7A and 7B for the regenerating mode.

The invention pertains to duty-cycle control of switch SW1 during the successive firing stages of converter CNV both in the motoring mode (thus, introducing cyclically the operation of switch SW1 alone, as opposed to FIG. 4) and in the regenerating mode (thus, excluding cyclically the operation of switch SW1, as opposed to FIGS. 5A and 5D). With this approach, switch SW1 is alternatively turned ON and OFF in the motoring mode and OFF and ON in the regenerating mode, the duration of such conduction and non-conduction periods being controlled in accordance with a duty-cycle determined in response to the sensed DC-link current and a desired average current flow in the inductor, the latter being according to a voltage demand on the capacitor voltage tending to keep such capacitor voltage constant under all conditions. In the motoring mode, the average current flow in the inductor will be increased to increase the capacitor voltage, and conversely if the capacitor voltage needs to be decreased. In the regenerating mode, the average current flow in the inductor will be increased to decrease the capacitor voltage, and conversely if the capacitor voltage needs to be increased. Such correction could be required either by a change in the mains voltage, or a change of power level, due to the load, on the inverter. In either mode, the average current through the inverter is influenced by changing the duty-cycle of switch SW1. When switch SW1 is OFF, the current is caused to fall (as shown from b to c on the curve of FIG. 6). When the switch is ON, the current is caused to rise (as shown from a to b on the curve of FIG. 6). As shown in FIG. 7B, for the motoring mode, when switch SW1 is ON the rising effect is obtained through bypassing capacitor C whereas, as shown in FIG. 8A, for the regenerating mode switch SW1 is effective to increase the current while going through capacitor C.

The duty-cycle will establish a constant flow of current through inductor L, thereby maintaining the right difference between the higher voltage on the inverter side and the lower voltage on the AC to DC converter side. This will be matching any lowering or rising of the mains voltage, as well as any excess of the regenerating effect in terms of inverter voltage on the DC-link. Accordingly, a controlled current build-up (by turning switch SW1 ON), or a current decrease (by turning switch SW1 OFF) through the inductance L will regulate the average current flow $i_{con}$ through the inductance L maintaining it constant at a chosen level $i^*_{con}$. That selected particular level will result in keeping the voltage across capacitor C at the level desired for the inverter and the load.

Moreover, instead of simply triggering ON the GTO in the regenerating mode concurrently with the auxiliary thyristor, as proposed in the incorporated-by-reference U.S. patent, provision is also made for holding such switch SW1 OFF should the current path exceed a critical level, and not to fire any thyristor in the firing sequence, nor to restart switch SW1 firing again until the current has reduced to zero, AND all previously conducting thyristors have had time to recover.

Two problems have been noted with the prior art circuit. One problem is due to the small fixed off-time delay used for switch SW1 in the regenerating mode. In such case, high line inductance or a voltage dip of the three phase supply could cause the previously conducting circuit thyristors (the pair from the converter bridge and thyristor TH7) not to recover before the next combination of thyristors (the subsequent pair and thyristor TH7) become triggered. This would cause input power supply fuses to blow, or damage the power devices of the converter. The second problem results from the mismatch (due to 3-phase power supply line dips, or occurring during changeover from motoring to regeneration) between capacitor voltage ($V_c$) and the rectified voltage at the output of the converter ($V_o$). This mismatch could cause very large current surges. These current surges could cause input fuse blowing and power switch damage, or overcurrent failure of the GTO (or transistor) device within switch SW1, which also would result in fuse blowing.

Controlling with a duty-cycle GTO (or transistor) devices added as bypass means to the diodes of the DC-link of a voltage-source coupled to an inverter in an AC motor drive, is known from U.S. Pat. No. 4,788,635 of T.D. Heinrich. This is effected, there, for controllably interrupting the GTO devices in response to the voltage difference between the converter DC output voltage and the inverter input voltage, in order to match one with the other, when in the regenerating mode of operation. In contrast, the present invention proposes to boost the voltage in order to benefit from a difference between converter voltage and inverter voltage. A two-quadrant DC-to-DC converter operated as a current-source boost converter has been described on pages 56 and 57 of "Switching Power Converters" by Peter Wood/Van Nostrand Reinhold Co., but its use, there, and implementation, have not been shown in the context of an AC motor drive.

Figure 10:
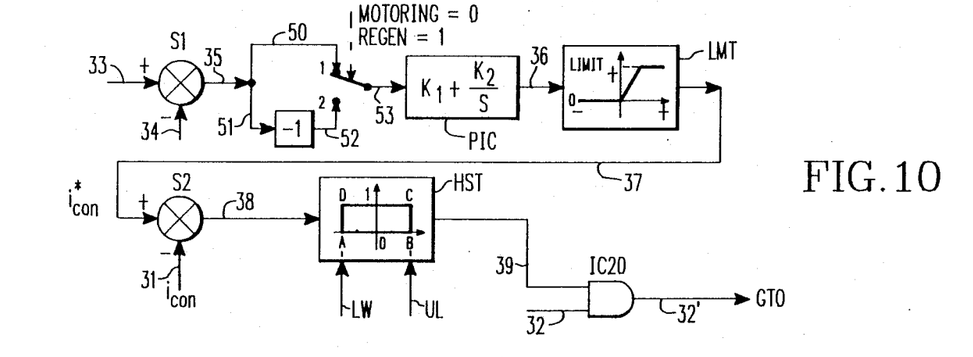
FIG. 10 illustrates with a block diagram a closed-loop boost voltage control circuit associated with the ACC circuit of FIG. 2, according to the present invention.

Referring to FIG. 10, according to the present invention, the current flowing in the DC-link is sensed by a current sensor CS and the derived signal is fed back (by line 31) into a duty-cycle control circuit DCC controlling by line 32 a bridge BDG linking inductor L and capacitor C of the DC-link. This bridge may be the combination of SW1, thyristor TH7 and diodes D1, D2 of FIG. 3, in which case line 32 goes to the GTO device for ON and OFF control thereof. Bridge BDG, more generally, includes several switches which perform, as generally known, a direct connection between the converter output and the inverter input for the current to flow through the DC-link, in either way, namely from CNV to INV in the forward mode, or conversely in the regenerating mode, the latter implying also a reversal of the respective polarities. Thus, bridge BDG could involve four GTO's, or two GTO's and two diodes like in the U.S. Pat. No. 4,788,635. The functions of the switches are (1) to connect input and output at opposite ends of the DC-link with (for one mode), or without (for the other mode) polarity reversal; and, alternatively, to cause, according to the present invention, a bypass of current to occur between the terminals associated with the inductor L while disconnecting the capacitor C from the bridge BDG. The purpose of such bypass of the inductor current flow is to either build-up a boost voltage upon capacitor C, or to limit such boost voltage These two operations will be explained now by reference to FIGS. 7A, 7B relating to the motoring mode and FIGS. 8A, 8B relating to the regenerating mode.

In the motoring mode, the GTO device (or transistor) of switch SW1 of FIG. 2 is used to bypass the capacitor side when it is turned ON. FIG. 7A shows the normal operation, with the GTO OFF. Current $i_{con}$ flows from the positive polarity terminal of converter CNV through the inductor L and, via diode D1, to the positive terminal TA of capacitor C at the inverter input. Current returns from the negative terminal TB via diode D2 to the other terminal of converter CNV. FIG. 7B shows that, when the GTO device is turned ON, current continues to flow as before from the converter, but it is bypassed onto terminal TB (since diode D1 isolates the capacitor therefrom) and it returns via diode D2 to the converter. Since the load is no longer connected, this bypass causes the current $i_{con}$ to increase, and energy (Ldi/dt) to accumulate in inductor L. If the GTO is again turned OFF, normal flow returns as shown in FIG. 7A and the increased energy of inductor L, acquired just before, is passed on to charge capacitor C, thereby boosting the voltage at the input of the inverter, while the current $i_{con}$ proceeds to fall since the capacitor voltage exceeds the converter voltage.

Figure 8B:
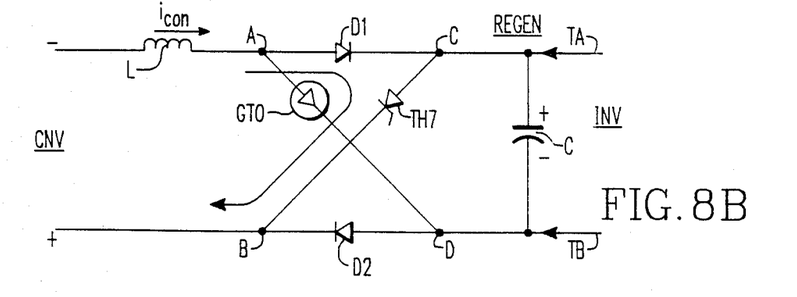

FIG. 8A shows the GTO device and the auxiliary thyristor TH7 being ON in the regenerating mode and concurring in connecting (1) the positive terminal TA from capacitor C to the lower terminal of the converter which is now the positive one, and (2) upper terminal of converter CNV, which is now the negative one, back to the negative terminal TB. In the regenerating mode, the voltage at the input of the inverter, built-up by the load regenerating back to the mains, is higher and is supplying energy to the converter side. When, as shown in FIG. 8B, the GTO is being turned OFF, energy from the converter is being bypassed via diode D1 and the still conducting thyristor TH7. The flow of current is now reducing the flow of $i_{con}$ through inductor L which causes the voltage on capacitor C to build up due to the energy returned from the motor. When the GTO is turned ON anew, the current in the reactor will tend to build up again, since the capacitor voltage exceeds the converter voltage. This current tends to discharge the capacitor further than the regenerating load charges it and, thus, translates the effect into a reduction of capacitor voltage. Therefore, $i_{con}$ will tend to increase when, as under FIG. 8A, the GTO is turned ON, and to decrease when the GTO, as under FIG. 8B, is turned OFF. The same is true in FIGS. 7A and 7B. If an upper limit UL and a lower limit LW are assigned to the deviation from the assigned current $i^*$con by applying these two limits to the duty cycle control circuit DCC of FIG. 6, the current will, as shown in FIG. 9 with curves, be kept between those two limits when increasing from a to b, and when decreasing from b to c, thus, averaging to $i^*_{con}$.

Figure 9:
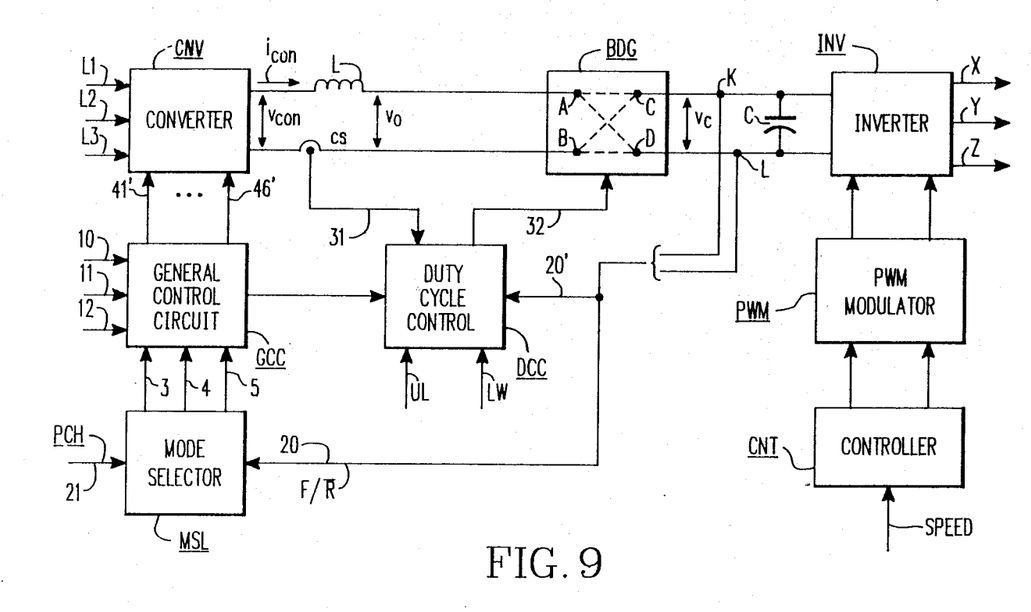
FIG. 9 is a block diagram of the ACC converter according to FIG. 2 when provided with the boost voltage control system according to the present invention.

The duty-cycle control circuit DCC of FIG. 9 is illustrated in FIG. 10 by a block diagram. The control circuit DCC is shown to include a summer S1 which subtracts the actual capacitor voltage $V_c$, as a signal applied on line 34, from a reference voltage which is the intended capacitor voltage $V_c$, as derived on line 33. On line 35 is generated an error which is amplified by a proportional and integral circuit PIC outputting a current error representative control signal which will be used as a demand signal for more or less converter current. In accordance with the mode of operation logic (Motoring=0, Regenerating=1) established on line 20 of the circuit of FIG. 1, the signal of line 35 is passed via lines 50 and 53 (motoring) to the PIC circuit or, via line 51, an inverting sign function NEG, and line 52 (regenerating) to the PIC circuit. The control signal is then carried by line 36 onto a limiter LMT and from there, on line 37, is derived a current reference signal i* indicating the desired current to be flowing through capacitor C. The signal of line 37 is passed to a second summer S2, operating as a subtractor with the sensed current representative signal of line 31. The error appearing on line 38 is applied to an hysteresis circuit HST having a logic ONE at the output (line 39) when the feedback signal of line 37 goes above the reference value of line 31 by a fixed amount (error positive), and a Zero when the feedback signal falls below the reference value by a fixed amount (error negative), the logic one meaning that SW1 is controlled for conduction, and the logic Zero that SW1 is controlled for non-conduction. An AND device IC20 receives line 39 and another line 32, the latter being (as shown hereinafter in FIG. 10) the logic of the pulse gating signal from circuit GCC (FIG. 1). Therefore, this AND device will enable or disable, according to the logic of line 32, the effect of the duty-cycle operation of circuit HST by line 39 and line 32' onto switch SW1. As a result, a bang-bang effect is produced by the SW1 device maintaining current flow, as shown in FIG. 6, between upper and lower limits U1 or LW have been reached at points a or b, and at or about the level defined by the current reference value of line 37. Referring to FIG. 9, current flow to and from capacitor C in the DC-link DCL is shown to depend upon whether the current charges (current increase from a to b on the curve) when the GTO device is conducting, or discharges the capacitor (current decrease from b to c) when the GTO device conduction has been interrupted. In the Heinrich patent, the object was to match the two opposite voltages of the DC-link, whereas according to the present invention, the object is to maintain, by controlling the duty-cycle, a level of current flowing through the inductor, thereby creating a desired boost voltage on the capacitor in relation to the aforementioned inputted boost voltage reference.

A two-quadrant DC-to-DC converter operated as a current-sourced boost converter has been described on pages 56 and 57 of "Switching Power Converters" by Peter Wood/Van Nostrand Reinhold Co. In contrast, the operation of the circuit of FIGS. 9 and 10 may be described as follows:

When switch SW1 is closed, and the load is operating in the forward mode, there is an energy build-up in the inductor L. This energy will be transferred to the capacitor C once the conduction of switch SW1 is interrupted. In other words, the current-source effect through the inductor L is translated into a voltage-source result which is the herebefore referred to boost appearing in the actual voltage $V_c$, as opposed to what $V_c$ would be without such boosting action under the duty cycle of conduction of switch SW1. This action is useful under conditions of a low AC power supply for keeping high the DC-link voltage. It makes also possible to regulate the capacitor voltage at a fixed level despite small variations in the AC power supply. Maintaining the capacitor voltage at a constant level enables the use of an AC motor of higher rating. It is also possible to use a standard 460v motor for sinusoidal PWM inverter applications on a 460v line. If a customer has a 460 volt motor, normally run on fixed frequency, using a variable speed drive on order to upgrade the installation, will require only to implement a voltage boost, as referred to hereabove.

Figure 11A:
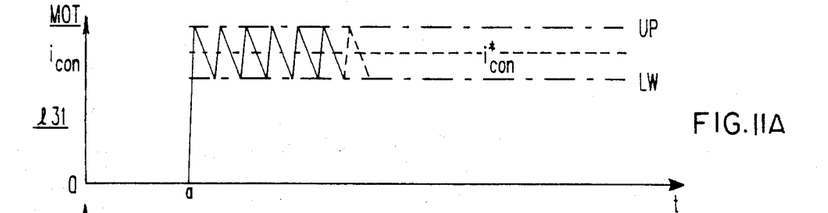
FIGS. 11A to 11F illustrate with curves the operation of the circuit of FIG. 10, for the motoring (FIGS. 11A to 11C) and for the regenerating (FIGS. 11D to 11E) mode, respectively.
Figure 11B:
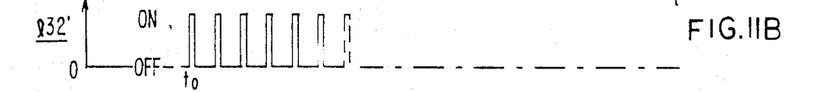
Figure 11C:
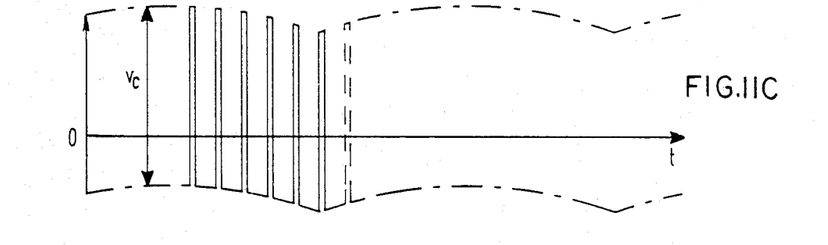

FIGS. 11A to 11E show in relation to FIG. 10 the operation for motoring and regenerating, respectively, namely when the logic of line 20 of FIG. 1 has made line 53 responsive to the signal of line 35 directly by line 50, or to the inverted sign value from line 52. FIGS. 11A 11C are is for the motoring mode. FIG. 11A shows the desired converter average current $i^*_{con}$. From a starting zero current value (at A) at the instant (to) when SW1 is triggered the current (icon) rises until it reaches the upper limit UP at which time the hysteresis circuit HST, by line 2, triggers SW1 OFF FIG. 11B and the current starts decreasing, at a lower rate than it was increasing, until the lower limit LW is reached and circuit HST triggers SW1 ON again, causing the current to increase. The bang-bang process continues during the 60-degree period of conduction of the thyristor under control in the 6-pulse bridge of FIG. 1. Curve (a) also shows the generally known decrease to zero of the current (at b every 60 degrees) followed by a period of recovery for the main thyristors of the converter. Thereafter (recurring at a) the converter and switch SW1 are retriggered. FIG. 11C shows the voltage across the inductor L being either equal to the voltage on the mains $V_m$ when switch SW1 is ON, or to the voltage ($V_m$-$V_c$) when SW1 is OFF. The average current i*con outputted by converter CNV is shown in dotted line.

Figure 11D:
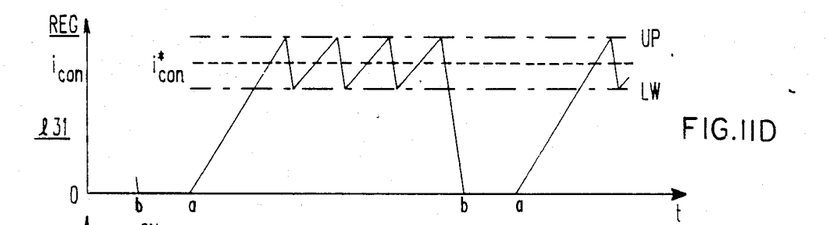
Figure 11E:
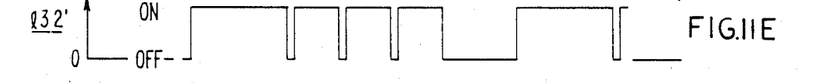
Figure 11F:
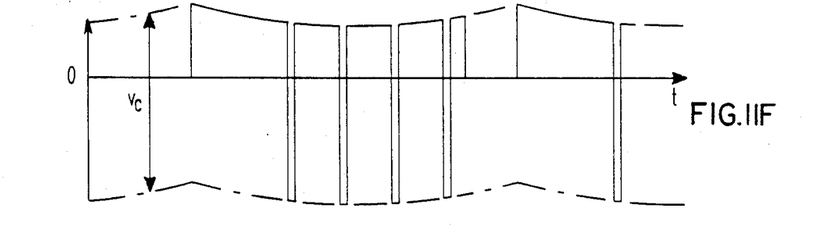

Similarly, FIG. 11D shows, for the regenerating mode, how from instant to current flowing through reactor L from the inverter terminals (TA,TB) into the converter rises, as the thyristors of the converter bridge are being fired in the regenerating mode, when SW1 is ON, but at a slower rate this time, until the upper limit UP is reached, at which time the hysteresis circuit HST will trigger SW1 OFF. The current, then, decreases down to the lower level LN, and the hysteresis circuit HST will again trigger SW1 ON, whereupon the current rises again, and so on. FIG. 11D shows the generally known decrease to zero of the current $i_{con}$ (at b every 650 degrees) followed by a period of recovery for the main thyristors of the converter. Thereafter (recurring at a) the converter and switch SW1 are retriggered. FIG. 11D also shows the desired converter current $i^*_{con}$. FIG. 11E shows the corresponding states of the GTO. FIG. 11F shows the voltage across the inductor L being equal either to the rectified voltage of the mains $V_m$ (negative this time) when SW1 is OFF, or to ($V_m$+$V_c$) when SW1 is ON.

Figure 12A:
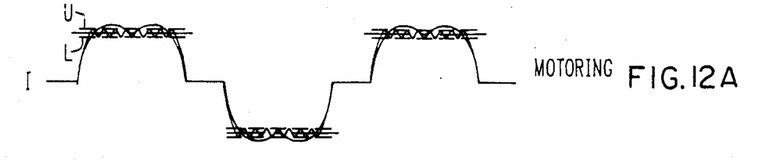
FIGS. 12A and 12B illustrate with curves the effect upon the mains line current of the invention for the motoring (FIG. 12A) and for the regenerating (FIG. 12B) modes.
Figure 12B:
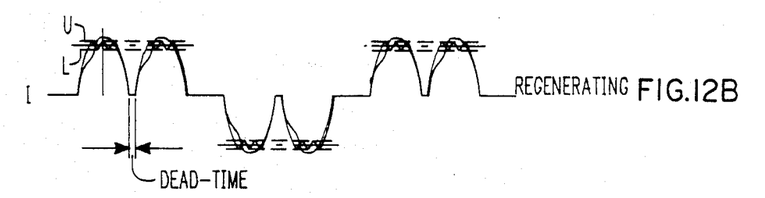

FIGS. 12A and 12B illustrate with curves, the waveforms of the current in the mains lines. FIG. 12 A shows the current for the motoring mode. The circuit of FIG. 1 will cause during the 60-degree period, a noticeable ripple, which will be replaced, due to the high frequency duty cycle of the GTO, by a smaller ripple (limited by the upper and lower limits UP and LW, earlier-mentioned with respect to FIGS. 11A and 11D). The same can be said of the mains current in the regenerating mode of operation, as shown in FIG. 12B.

Figure 13:
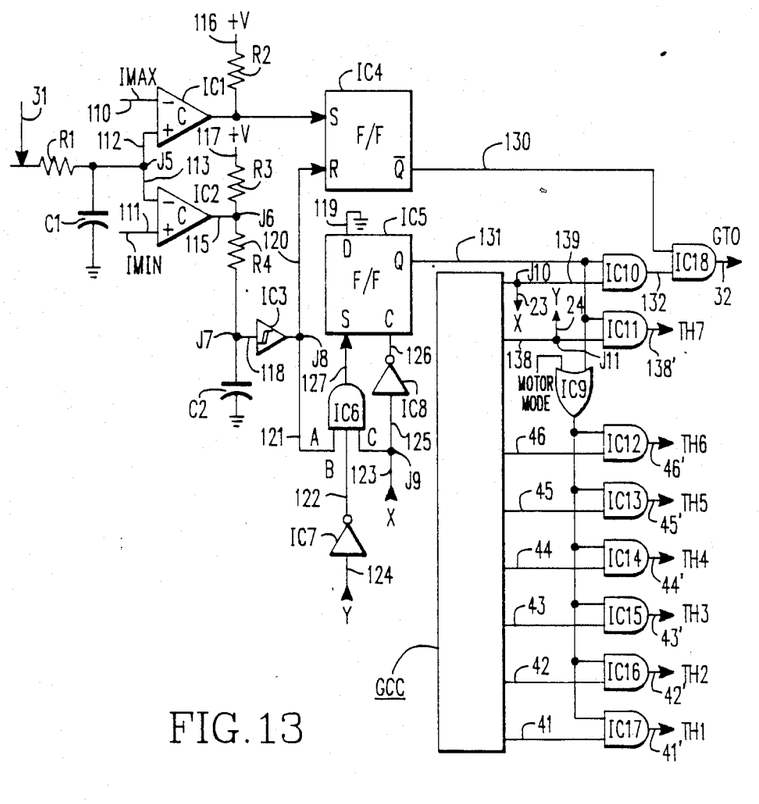
FIG. 13 shows the circuit of FIG. 10 modified so as to embody overcurrent protection, besides boost voltage regulation.

FIG. 13 shows the overcurrent protection circuit added to the circuits of FIGS. 9 and 10. Illustratively, FIG. 13 shows the general control circuit GCC of converter CNV which applies the control pulses 41 to 46 for thyristors TH1 to TH6 of the CNV bridge. GCC also applies a control pulse on line 139 for switch SW1 (a GTO or a transistor) and, on line 138, a control pulse for the auxiliary thyristor TH7.

According to the present invention, the sensed voltage signal of line 31 (representing the DC-link current) is filtered by resistor R1 and capacitor C1, then applied by line 112 to a comparator IC1 by line 113 to another comparator IC2. The reference for IC1 is a signal Imax applied on line 110 to the inverting input of the comparator, representing an upper limit imposed to the DC-link current. The reference for IC2 is a signal Imin applied to the non-inverting input of the comparator, representing a lower limit imposed to the DC-link current. The output of IC1 is a ONE, or a Zero, appearing on line 114 which is connected by resistor R2 to a positive potential +V. Line 114 is applied to the SET input of a flip-flop IC4, having its output (Q) on line 130 serving as second input for an AND device IC18 already responsive to the GTO control signal of line 139. Accordingly, IC18 outputs the control signal of line 32 of FIG. 10, the latter being conditioned, however, by the output status of another AND device IC10, as shown hereinafter. If the current of line 31 exceeds the maximum allowed current (Imax), the logic output Q of flip-flop IC4 is set low. This turns OFF the GTO via AND gate IC18. Accordingly, the current in the power circuit begins to decay. In the process, when the current reaches the minimum Imin (the latter may be chosen to be approximately zero current for line 31), the second comparator IC2 becomes an open circuit. The output of IC2 is connected to the nodal point J6 of two resistors R3, R4 pertaining to a series network including a capacitor C2 and extending between the potential +V and ground. The junction J7 between R4 and C2 is inputted by line 118 into Schmitt circuit IC3, the output J8 of which (by line 120) goes high to reset (input R) flip-flop IC4. This J8 output also goes by line 121 to an AND device IC6 which, by line 127, goes to the Set input S of another flip-flop IC5, the Q ouput of which goes, by line 131, to the second input of AND device IC10. Therefore, once comparator IC2 has exceeded its threshold, C2 is charging through R3 and R4, with a corresponding time constant (defined by R3, R4 and C2). This delay represents the time the thyristors need to recover. The Schmitt device IC3 goes high and flip-flop IC4 is reset, whereby the GTO is allowed to be turned ON. The general control circuit GCC (FIG. 1) generates on line 23 (signal X) the control signal to turn ON the GTO and on line 24 (signal Y) the control signal to turn OFF the GTO. The signals of lines 23 (appearing as C) and 24 (inverted by IC7 and appearing on line 122 as B) are combined at the output with the signal of line 121 (appearing as A). The table of truth between A, B, C determines the status of line 127, and the setting of flip-flop IC5.

The operation of the overcurrent protection circuit of FIG. 13 is as follows:

In the notoring mode (lines 50 and 53 of FIG. 7), the output of OR gate IC9 will be low. Therefore, considering AND gates IC12 to IC17, the converter bridge thyristors will be gated by lines 41 to 46 in the motoring mode.

When the circuit is initiated in the regenerating mode initially the current will, in the shunt CS of FIG. 6, be zero. Therefore, the output of comparator IC2 will be an open circuit. After the time delay of charging C2, Schmitt circuit IC3 will go high at junction J8, and the input A of IC6 will be high. Concurrently, being in the regenerative mode, the GTO is turned ON (lines 51, 52 and 53 of FIG. 10). This means that input C of IC6 will be high. When no reversing bridge firing pulse is present, the B input of IC6 will go high. Since all three inputs of IC6 are high, flip-flop IC5 is set by line 27. This allows all the thyristors and the GTO to receive firing signals from GCC. The DC-link will then rise and shut OFF the allowing input A of line 21 into IC6. This prevents further setting of flip-flop IC5. At the end of the regenerative pulse of line 32 the GTO is turned OFF. This causes IC5 to be clocked by lines 25 and 26. The result is that the Q output of IC5 goes to zero. This inhibits further firing of the power devices in the regenerative mode until AND device IC6 resets flip-flop IC5.

From the preceding it appears that an ACC circuit has been improved with close-loop control of the converter bridge. The addition of a shunt in the DC-link allows the monitoring of both the GTO (or transistor) and auxiliary thyristor current, for capacitor voltage regulation and/or for overcurrent protection. One approach offers voltage boost, a useful feature for keeping the DC-link voltage high under low voltage threephase mains line condition or for regulating the capacitor voltage to a fixed level regardless of small voltage variations in the supply voltage, in either the motoring or the regenerating mode. This approach also allows in an AC motor drive a better utilization of the inverter, the capacitor voltage being regulated for a constant and higher level. Using lower current and cheaper inverter switches will be possible. Another benefit is the use of a standard motor of higher rating despite the lower voltage of the supply lines. If the voltage derived from the rectified 460V line is insufficiently high, sinusoidal PWM energization of as motor built for standard 460v could not be used if it need to be run up to 60 Hz. The user will be able to upgrade the installation originally done with a standard 460V motor for fixed frequency, and to make it a variable speed drive using the boost technique with the existing motor. Overcurrent protection, with or without the boost voltage feature, will protect the motor drive against blowing fuses and its adverse effects.

What is claimed is:

1. In an AC motor drive system including:
   an AC/DC converter having three-phase AC input lines, opposite poles, main thyristors forming a bridge across said AC input lines and said poles and means for sequentially firing said main thyristors; a precharged DC-link capacitor across said poles; an inverter having AC output lines, DC terminals connecting said DC-link capacitor to the inverter, and an AC motor supplied by said AC output lines;
   with first and second diode means operatively connected each between a corresponding pole of said thyristor bridge and an associated end of said DC-link capacitor for providing a current path between conducting main thyristors when the motor drive system is operating in one of the motoring and regenerating modes;

with additional first and second static switches cross-coupled between respective ends of said DC-link capacitor and respective poles of said thyristor bridge;

with means for controlling said first and second additional static switches (a) OFF for passing said current path through said DC-link capacitor in one direction when the motor drive is in the motoring mode and (b) ON for passing current in the opposite direction when the motor drive is in the regenerating mode, thereby to allow feedback from said DC terminals through said converter onto said AC input lines;

means for sensing the current of said current path to derive current representative signal;

one forced-commutated switch being used as one of said first and second additional static switches and an auxiliary thyristor being used as the other of said first and second additional static switches, said DC-link capacitor being bypassed (1) in the motoring mode by said forced-commutated switch when turned ON and (2) in the regenerating mode by said auxiliary thyristor being ON whereas said forced-commutated switch is turned OFF; the combination of:

current control loop means operative upon said controlling means for applying to said forced-commutated switch a duty-cycle OFF/ON in accordance with, respectively, a given excess and a given want of said current relative to a reference current related to a boost voltage for said DC-link capacitor;

voltage control loop means being provided to generate said reference current and responsive to a present voltage of said DC-link capacitor and to a predetermined desired voltage for voltage boosting thereof to derive a voltage error, the sign of said voltage error being changed to the opposite when in the regenerating mode, said current reference being established in relation to said voltage error;

whereby said current control loop is effective in establishing said forced-commutated switch duty-cycle.

2. The motor drive system according to claim 1 with said forced-commutated switch being disabled by said main thyristors gating means when in the regenerating mode for allowing commutation of the converter main thyristors and of said auxiliary thyristor during an OFF time interval, such OFF time interval being sufficient to allow decay of said current to zero and to provide a constant thyristor recovery period thereafter, reenabling of said controlling means being effected after each reoccurrence of such OFF time interval.

3. The motor drive system of claim 1 with means for inhibiting said converter means and said control means when said current representative signal exceeds a predetermined critical value.

* * * * *